(No Model.)
W. B. B. WALKER.
FRUIT GATHERER.
No. 442,928. Patented Dec. 16, 1890.
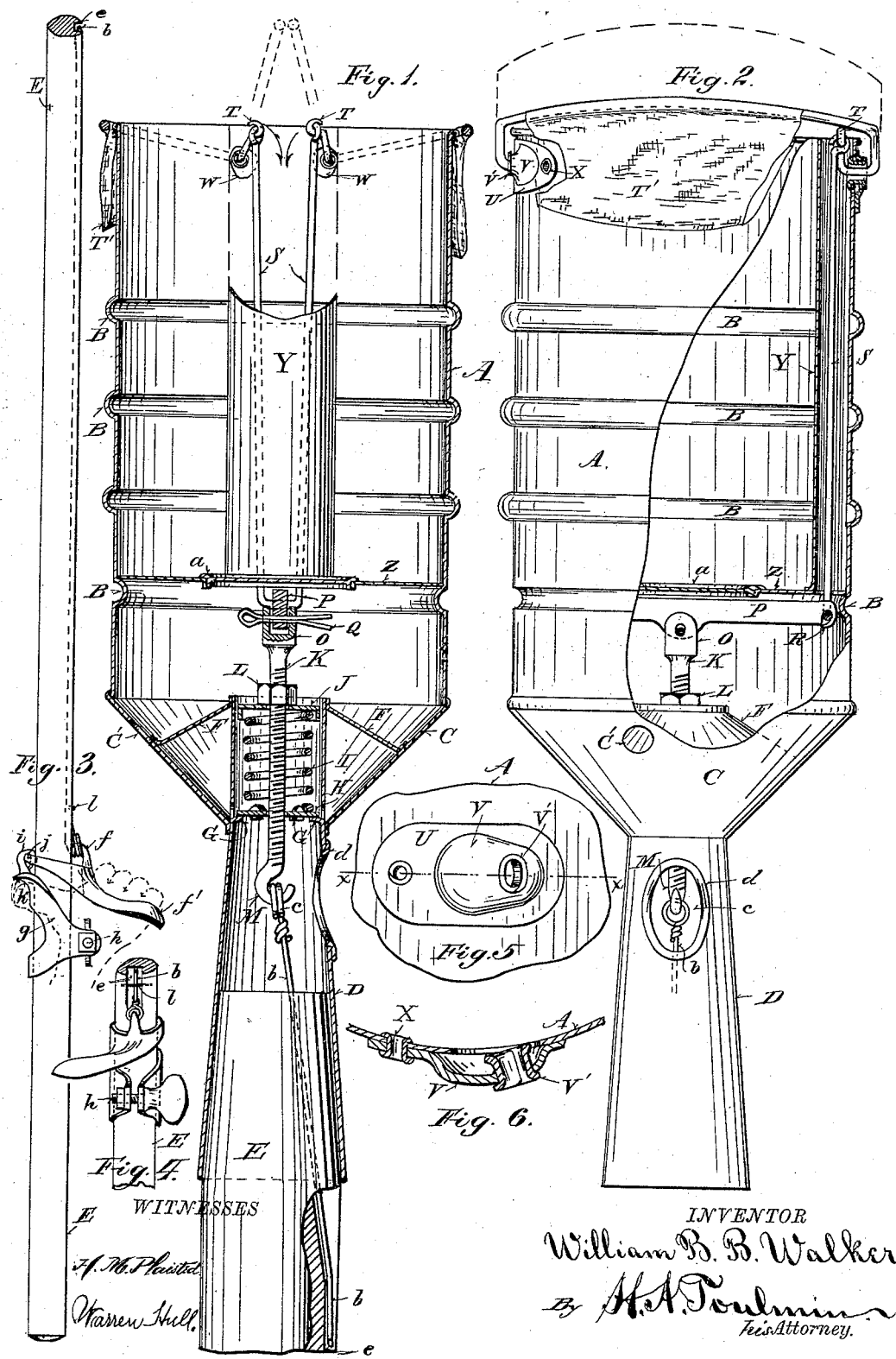
WITNESSES
H. M. Plaisted
Warren Hull
INVENTOR
William B. B. Walker
By H. A. Toulmin
his Attorney

UNITED STATES PATENT OFFICE.

WILLIAM B. B. WALKER, OF SPRINGFIELD, OHIO.

FRUIT-GATHERER.

SPECIFICATION forming part of Letters Patent No. 442,928, dated December 16, 1890.

Application filed May 2, 1890. Serial No. 350,273. (No model.)

*To all whom it may concern:*

Be it known that I, WILLIAM B. B. WALKER, a citizen of the United States, residing at Springfield, in the county of Clark and State of Ohio, have invented certain new and useful Improvements in Fruit-Gatherers, of which the following is a specification, reference being had therein to the accompanying drawings.

This invention relates to certain new and useful improvements in fruit-gatherers.

My improvements have reference to a receiving can or receptacle for the fruit being picked, have reference to a picking mechanism to detach the fruit from the tree, have reference to bearing-plates for the crank portions of said mechanism, have reference to a convenient kind of supporting and actuating lever for said picking mechanism, and have reference to other points of detail hereinafter set forth.

In the accompanying drawings, forming a part of this specification, and on which like reference-letters indicate corresponding parts, Figure 1 represents a vertical sectional view of the receiving-can and its interior mechanism, the picking device being shown in its open position; Fig. 2, a side view of said can, portions of it being broken away; Fig. 3, a portion of the supporting-pole and a side view of the actuating mechanism on a smaller scale; Fig. 4, an edge view of the same; Fig. 5, a portion of the can having the bearing-plate mounted thereon, and Fig. 6 a sectional view of Fig. 5 on the line $x$ $x$.

The letter A designates a can or other receptacle for fruit while being picked, and made of tin or other suitable material. It is preferably of a cylindrical form, open at the top, and strengthened at the sides by ribs or grooves B, whereby the said can can be made light and strong. An inclined bottom C connects the lower end of said can with the socket D, preferably of a tapering form, adapted to be mounted on a pole E and easily removed therefrom, so as to allow of the use of poles of different lengths, according to the height of the fruit to be picked. A strengthening web or brace F is secured to the upper end of the said socket, which extends within the said can and connects it with the inclined bottom C or other portion of the can, so as to firmly brace the said socket and form a strong connection with the bottom of said can. The inclined bottom C permits of the easy withdrawal of the can from the branches or brush among which it may be used without catching on the same and thus jerking out or spilling the fruit contained therein. A projection or shoulder G, conveniently formed by turning in portions of the socket, as shown in Fig. 1, so as to form a rest for a disk H bearing thereon, supports a coil-spring I within the upper end of said socket. The top of this spring is covered by a plate J, preferably having turned-down edges to inclose and guide said spring and a central orifice through which extends a threaded bolt or stem K and bearing on the plate J by means of a nut L, screwed on the said bolt. The lower end of the said bolt has a hook M conveniently formed thereon, and the upper end has a jaw O or other means of connection with a cross-bar or equalizing-lever P, preferably pivoted to said rod by a cotter or pin Q, so as to be readily connected thereto. This bar is preferably formed of malleable iron or other suitable material, and has a hook R at each of the ends thereof, adapted to be bent over and form an eye after the insertion of a U-shaped connecting-rod S at each end of said bar. The can in Fig. 2 is broken away to show the engagement of one end of the bar P with its rod S. The other end is arranged in the same manner. The upper end of this rod S is conveniently bent to form eyes engaging with the similar eyes or hooks T, formed on the crank ends of the picking or nipping jaws, now to be described. These preferably consist of stiff wire bent at the ends to form cranks and extending through the bearing-plates U, secured to the sides of said can. Each jaw radiates from its bearing-plate and preferably has a curved portion extending across the said can and meeting its opposing jaw when the said jaws are in their raised positions, as indicated by the dotted lines in Fig. 1. These jaws preferably have inclosing shields or guards T', of ticking or other suitable material, connecting said curved portion with the rim of said can, so as to prevent the fruit from escaping while being picked or when the can is being lowered to empty the same into a large basket or other receptacle.

These bearing-plates U consist of a piece of metal preferably having a swelled portion V, in which is inserted the bearing socket or eye V'. This forms a broad bearing for each crank portion of the said jaws, and also strengthens that portion of the can. The hooks T are preferably formed before the said jaw is connected with said can and necessitate cutting away a larger portion of the can, as shown at W, in order to insert the hooks therein. These bearing-plates cover this cut-away portion, and are secured to the can by eyelets X, which conveniently hold said sockets in position while they are being soldered or otherwise fastened. The holes for said eyelets may therefore be punched in the can and the plates placed in the desired position. The eyelets are inserted and closed and the solder is quickly applied. The rods S and the crank portions of the nipping-jaws within the can are preferably inclosed by a semicircular shield Y, extending from the top of the can to a false bottom Z, resting on one of the grooves B, which is turned in instead of out, and thus supports the said false bottom in a convenient position just above the equalizing-lever. An opening having a cover a is formed in said bottom Z to allow access to the nut L on the rod K, in order to adjust the tension of the spring I. Thus the nipping mechanism is separated from the fruit in the can and is not obstructed by the same. Any dirt that may find entrance to the space below the false bottom Z is readily discharged through the opening C' within the bottom of said can. If desired, the nut may be turned through an opening in the side of the can, and the false bottom Z may be made without any opening therein.

I will now describe the actuating mechanism for operating the foregoing picking mechanism. The hook M on the lower end of the said rod K is conveniently engaged by a wire b, having an eyelet formed on the upper end thereof composed of two or more circles, so as to make up for the loss by the wear on the said hook. This wire is adapted to be engaged and disengaged to and from said hook, as it forms part of the actuating mechanism, whereby any length of pole may be used with the receiving-can. An opening c within the said socket D provides for the ready engagement and disengagement of the said hooks and wire. A strengthening-rib d is soldered or otherwise secured around the edge of the said opening to make up for the lost strength caused by cutting the same. This wire b extends along a slot e, formed within the supporting-pole, and is attached by a similar clamp to that at the top to a hook f on the handle f' of the actuating mechanism. This handle is formed in one piece and encircles the pole, being held in its desired position by a clamp g, secured in any convenient position on said pole by means of a bolt and a nut h, as shown in Fig. 4. This clamp has a hook portion i, which is preferably cast open and then bent round the bearing portion j of said handle, by which means it is pivotally connected with said clamp. The clamp and handle are preferably formed of malleable iron or other suitable material. The clamp portion has a projecting surface k, adapted to receive the thumb when the fingers are in their correct position on the handle, as shown by the dotted lines in Fig. 3. Thus the thumb assists in supporting the pole, while the fingers actuate the lever-handle to cause the nipping-jaws to inclose and detach the fruit. The wire b may be alongside of the pole instead of in the socket e; but it is preferred to place it within the socket and to secure it by staples l, if necessary, so as to present a smooth surface to the hand while handling the pole. Thus it will be seen that by pressing the handle f' the wire b draws the bolt K downward against the action of the spring I, and thus raising and closing the nipping-jaws. In lowering the can from its position in the tree these jaws may be kept closed, and the shields F' will prevent the fruit from being spilled from the can until it reaches the basket, when they are opened to discharge the fruit. All danger of bruising the fruit is thus avoided, and it will be kept much longer and in better condition; also, fruit such as cherries, plums, &c., may be gathered from otherwise inaccessible positions, as on the outer ends of the upper branches. The action of the spring I tends to keep the jaws open, unless operated by the handle f'. The tension of this spring may be varied, as before suggested, by turning the nut L, and the wire b may be kept taut by adjusting the clamp g on the lower end of the supporting-pole. The rest for the thumb on the said clamp lessens the weariness from holding the same, as it is curved to convenient shape to fit the thumb.

The guard Y and the false bottom Z may be replaced by a canvas lining, which will likewise shield the rods S and support the fruit above the lever P.

Having thus fully described my invention, what I claim as new, and desire to secure by Letters Patent, is—

1. In a fruit-gatherer, the combination, with a receptacle adapted to receive fruit and having bearings near its upper end, of nipping-jaws composed of rods extending across the receptacle, having radial portions and mounted in said bearings, with the ends forming cranks within the said receptacle, rods connected to said cranks and running down on the inside of the receptacle near its walls, and a cross-bar connected to said rods and having a central attachment to operate it, whereby the bar acts as an equalizer and insures the proper action of both jaws.

2. In a fruit-gatherer, the combination, with a receptacle having strengthening-ribs, an inclined bottom, a socket extending within said receptacle, and a web or brace connecting and bracing the top of said socket to the bottom of said receptacle, of a supporting-pole for said receptacle, fitting within said socket, whereby the receptacle may be readily withdrawn from the branches and be rigidly supported on said pole.

3. In a fruit-gatherer, the combination, with a pole, of a lever-handle formed in one piece and embracing said pole and provided with a hook, and a clamp adjustably mounted on said pole, having an eye by which said handle is pivotally connected therewith, and provided with clamping means, and also having a curved portion shaped to fit the thumb when the fingers are engaged with said lever-handle.

4. In a fruit-gatherer, the combination, with a receptacle, its socket, and its supporting-pole having a slot therein, of nipping-jaws pivoted to said receptacle and having cranks extending within this receptacle, a shield or guard connected to said jaws and said receptacle to prevent spilling the fruit, a cross-bar having a hook in each end, U-shaped rods connecting said hooks with said cranks, a threaded stem provided with a nut and engaging the said bar at one end and having a hook at the other end, a pair of plates within said socket, one plate engaging said socket, the other mounted on said stem beneath the nut, a coil-spring mounted on said stem between said plates and acting to normally open said nipping-jaws, and a wire running along the slot in said pole and connecting the hook on said stem to an actuating mechanism mounted on the lower end of said pole.

5. In a fruit-gatherer, the combination, with a rigid receptacle having interior guards adjacent to the wall, of nipping-jaws consisting each of radial portions, a cross portion connecting said radial portions, and cranks, a rod connected to each crank and running down through the guards, a cross-bar connecting said rods, a stem connected centrally with said bar, and a spring acting upward on the stem to normally open the jaws.

In testimony whereof I affix my signature in presence of two witnesses.

WILLIAM B. B. WALKER.

Witnesses:
OLIVER H. MILLER,
WARREN HULL.